(No Model.)
H. L. SPRAGUE.
LAWN CUTTER.
No. 363,260. Patented May 17, 1887.
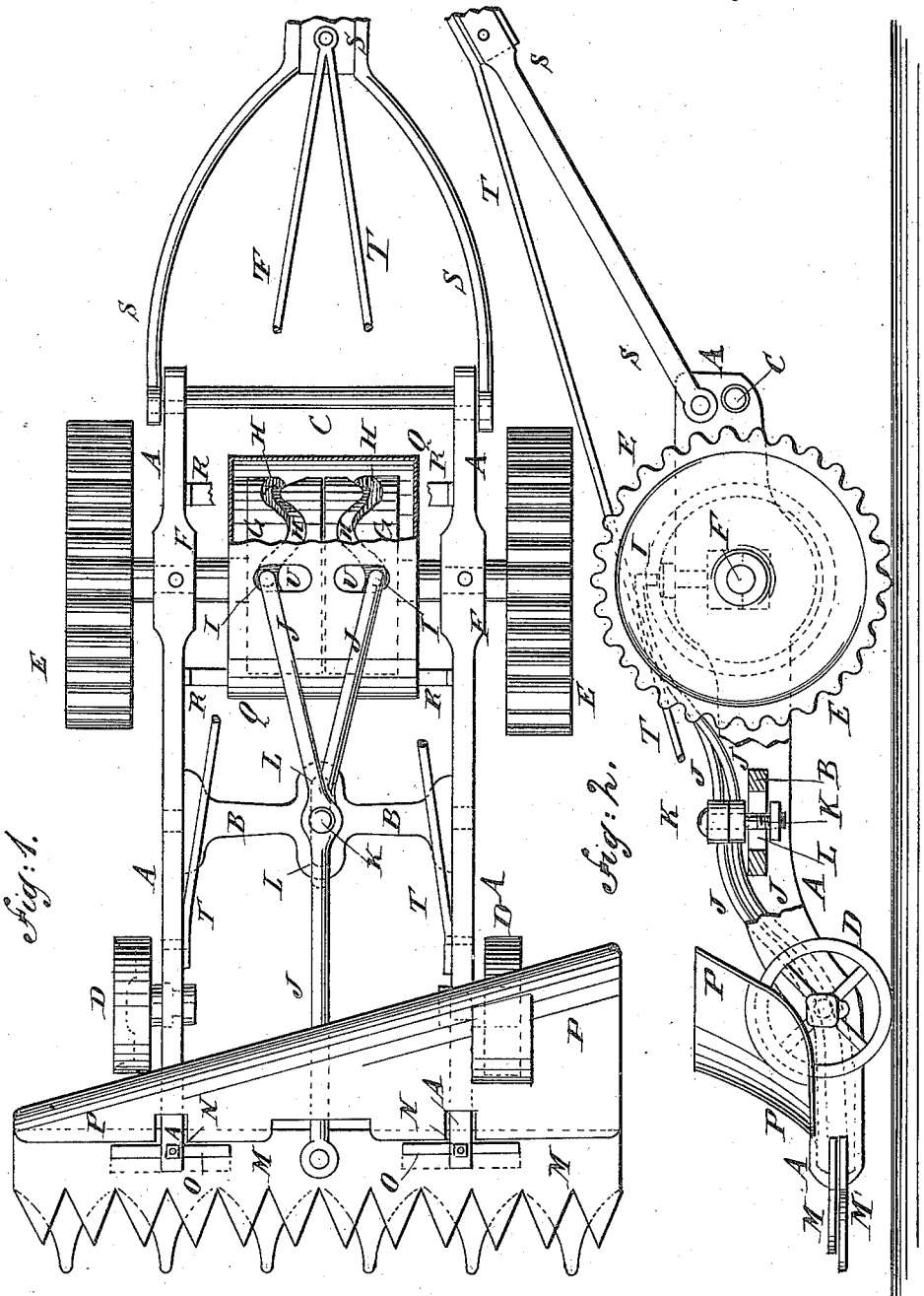
WITNESSES:
INVENTOR:
H. L. Sprague
BY Munn & Co.
ATTORNEYS.

UNITED STATES PATENT OFFICE.

HENRY L. SPRAGUE, OF TOTTENVILLE, NEW YORK.

LAWN-CUTTER.

SPECIFICATION forming part of Letters Patent No. 363,260, dated May 17, 1883.

Application filed June 14, 1886. Serial No. 205,077. (No model.)

*To all whom it may concern:*

Be it known that I, HENRY L. SPRAGUE, of Tottenville, in the county of Richmond and State of New York, have invented a new and useful Improvement in Lawn-Cutters, of which the following is a full, clear, and exact description.

Reference is to be had to the accompanying drawings, forming a part of this specification, in which similar letters of reference indicate corresponding parts in both the figures.

Figure 1 is a plan view of my improved lawn-cutter, parts being broken away. Fig. 2 is a side elevation of the same, parts being broken away.

The object of this invention is to provide lawn-cutters constructed in such a manner that they will be reliable in operation whether the grass be short or long, and which at the same time shall be simple in construction and convenient in use.

The invention consists in the construction and combination of various parts of the lawn-cutter, as will be hereinafter fully described, and then claimed.

A represents the side bars of the frame, which are connected at their middle parts by a cross-bar, B, and at their rear ends by a round, C.

The forward part of the machine is supported by two small wheels, D, the journals of which are attached to the forward parts of the side bars, A. The rear part of the machine is supported by the large wheels E, the axle F of which revolves in bearings in the rear parts of the side bars, A, and the faces of which are corrugated to prevent them from slipping upon the ground, so that they will drive the cutter-bars continuously.

To the axle F is attached a drum, G, in the face of which are formed two zigzag grooves, H, to receive pins I, formed upon or attached to the rear ends of the levers J, so that the said levers will be vibrated by the revolution of the drum G. The grooves H are so formed that the corresponding bends of the two grooves will alternate with each other, as shown in Fig. 1, so that the rear ends of the two levers J will always be moving in opposite directions. The levers J at their middle parts are fulcrumed to a bolt, K, which passes through them and through a slot, L, in the widened middle part of the cross-bar B, to allow the fulcrum-bolt to have a slight movement forward and back, so that the forward ends of the said levers can move laterally in straight lines.

The forward ends of the two levers J are pivoted to the centers of two cutter-bars, M M', which are placed one above the other, and which slide in slots in the forward ends of the side bars, A, where they are secured in place by bolts N, passing through the said slotted ends of the side bars, A, and through longitudinal slots O in the said cutter-bars M M'. By this construction the cutter-bars M M' will always move in opposite directions, so that the grass will be cut with a shear cut.

The cutters of the lower cutter-bar, M', are extended and their forward ends are rounded, so that the said extended ends will serve as guard-fingers to prevent the edges of the cutters from coming in contact with trees, posts, or other obstructions and being dulled.

To the forward parts of the side bars, A, is attached a guide-plate, P, which is widened toward one end and has its rear part curved upward. The forward edge of the guide-plate P overlaps the rear edge of the upper cutter-bar, M, so that the said plate will receive the cut grass and guide it to one side of the machine, to prevent the said cut grass from lodging upon and clogging the operating parts of the machine. The wider part of the guide-plate P has a recess formed in its lower side, to receive the upper part of the wheel D, as indicated in Figs. 1 and 2, to allow the said part of the plate P to be placed sufficiently low to receive the cut grass and allow it to pass off the wider end of the said plate freely.

The grooved drum G is inclosed by a cylindrical casing, Q, to protect it from the cut grass or other obstructions that might interfere with the travel of the pins I along the grooves H, and has slots U, formed in its upper side, for the passage of the said pins, the said slots having such a length as will allow the said pins to have a free movement.

The casing Q is connected with and supported from the side bars, A, by means of stay-bars R, attached to the said side bars and to the ends of the said casing.

The machine is propelled by means of a handle, S, the forward end of which is forked, and the ends of its prongs are bolted to the rear ends of the side bars, A. The handle S is strengthened in position by braces T, the rear ends of which are attached to the said handle, and their forward ends are attached to the forward parts of the side bars, A, as shown in Fig. 1.

The pins I are provided with tubular washers to lessen the friction between the said pins and the sides of the grooves H in the drum G.

I am aware that it is not broadly new in lawn-mowers to operate the knives by means of levers resting in cam-grooves in a revolving drum on the axle; also, that such mowers have been provided with a shield in front of the grooved drum, and I do not broadly claim the same as of my invention.

Having thus described my invention, what I claim as new, and desire to secure by Letters Patent, is—

1. In a lawn-cutter, the combination, with the side bars, A, the cross-bar B, having a slot, L, in its widened middle part, the small forward wheels, D, and the drive-wheels E and their axle F, of the drum G, having two zigzag grooves, H, the two levers J, having pins I, engaging the said grooved drum, the bolt K, pivoting the said levers to the said slotted cross-bar B, and the two vibrating cutter-bars M M', sliding in slots in the said side bars, A, and connected with the said levers J, substantially as herein shown and described, whereby the said lawn-cutter is adapted to cut grass of any length required, as set forth.

2. The side bars, A, drum G, having cam-grooves H, and a slotted casing, Q, encircling the drum G, in combination with the pivoted knife-operating levers J, extending through the slots of the casing Q, and having pins I, resting in the cam-grooves of the revolving drum G, substantially as shown and described.

3. In a lawn-cutter, the combination, with the side bars, A, and the upper vibrating cutter-bar, M, of the lower vibrating cutter-bar, M', having its cutters extended forward and rounded at their forward ends, substantially as herein shown and described, whereby the said cutters are adapted to serve as guard-fingers, as set forth.

HENRY L. SPRAGUE.

Witnesses:
WILLIAM D. FRERICHS,
GEORGE W. SPRAGUE.